(12) United States Patent (10) Patent No.: US 12,567,241 B2

Mizukami (45) Date of Patent: Mar. 3, 2026

(54) METHOD FOR GENERATING TRAINING DATA USED TO LEARN MACHINE LEARNING MODEL, SYSTEM, AND NON-TRANSITORY COMPUTER-READABLE STORAGE MEDIUM STORING COMPUTER PROGRAM

(71) Applicant: SEIKO EPSON CORPORATION, Tokyo (JP)

(72) Inventor: Hiromitsu Mizukami, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 376 days.

(21) Appl. No.: 17/988,795

(22) Filed: Nov. 17, 2022

(65) Prior Publication Data

US 2023/0154162 A1 May 18, 2023

(30) Foreign Application Priority Data

Nov. 18, 2021 (JP) ................................. 2021-187668

(51) Int. Cl.
*G06V 10/774* (2022.01)
*B25J 9/16* (2006.01)
*G06V 10/145* (2022.01)

(52) U.S. Cl.
CPC .......... *G06V 10/774* (2022.01); *B25J 9/1697* (2013.01); *G06V 10/145* (2022.01)

(58) Field of Classification Search
CPC .... G06V 10/774; G06V 10/145; G06V 10/24; G06V 10/255; G06V 10/772;

(Continued)

(56) References Cited

U.S. PATENT DOCUMENTS

| | | | | |
|---|---|---|---|---|
| 2008/0186390 | A1* | 8/2008 | Sato | ...................... G06T 3/4053 |
| | | | | 348/222.1 |
| 2014/0198951 | A1 | 7/2014 | Aoba et al. | |

(Continued)

FOREIGN PATENT DOCUMENTS

| | | |
|---|---|---|
| JP | 2014-137756 A | 7/2014 |
| JP | 2018-116599 A | 7/2018 |
| JP | 2020-087310 A | 6/2020 |

*Primary Examiner* — Michelle M Koeth

(74) *Attorney, Agent, or Firm* — Harness, Dickey & Pierce, P.L.C.

(57) ABSTRACT

A method includes: (a) executing prior learning of the machine learning model, using simulation data of an object; (b) capturing a first image of the object from a first direction of image capture; (c) recognizing a first position and attitude of the object from the first image, using the machine learning model already learned through the prior learning; (d) performing a correctness determination about the first position and attitude; (e) capturing a second image of the object from a second direction of image capture that is different from the first direction of image capture when it is determined that the first position and attitude is correct, then converting the first position and attitude according to a change from the first direction of image capture to the second direction of image capture and thus calculating a second position and attitude, and assigning the second position and attitude to the second image and thus generating training data; and (f) changing an actual position and attitude of the object and repeating the (b) to (e).

7 Claims, 10 Drawing Sheets

(58) Field of Classification Search
CPC .......... B25J 9/1697; G06T 2207/20081; G06T
2207/30164; G06T 7/74; G05B
2219/40053; G05B 2219/40532; G06N
20/00
See application file for complete search history.

(56) References Cited

U.S. PATENT DOCUMENTS

| | | | |
|---|---|---|---|
| 2018/0211138 A1 | 7/2018 | Yamada et al. | |
| 2018/0359489 A1* | 12/2018 | Lakshman ........... | H04N 19/597 |
| 2020/0175376 A1 | 6/2020 | Sekii | |
| 2021/0042576 A1* | 2/2021 | Namiki ................ | G06F 18/217 |
| 2021/0245365 A1* | 8/2021 | Sugahara ................ | B25J 9/163 |
| 2022/0028105 A1* | 1/2022 | Hasegawa ................ | G06T 7/50 |

* cited by examiner

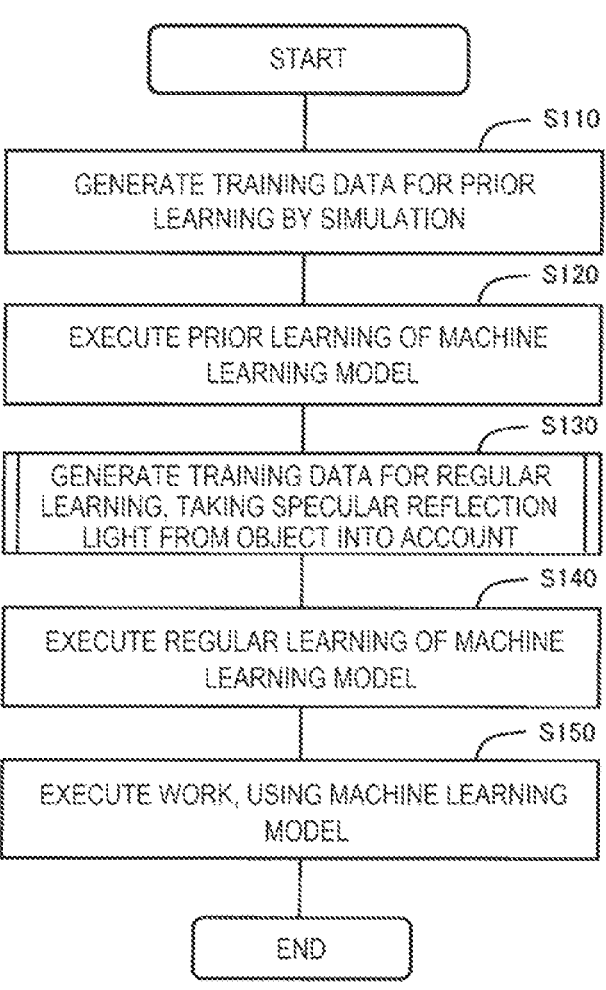

START

GENERATE TRAINING DATA FOR PRIOR
LEARNING BY SIMULATION — S110

EXECUTE PRIOR LEARNING OF MACHINE
LEARNING MODEL — S120

GENERATE TRAINING DATA FOR REGULAR
LEARNING, TAKING SPECULAR REFLECTION
LIGHT FROM OBJECT INTO ACCOUNT — S130

EXECUTE REGULAR LEARNING OF MACHINE
LEARNING MODEL — S140

EXECUTE WORK, USING MACHINE LEARNING
MODEL — S150

END

*FIG. 5*

SD {
    CAD DATA ⟶
    VARIOUS PARAMETERS ⟶
} ⟶ SCENE SIMULATOR — SS ⟶ TRAINING DATA
FOR PRIOR
LEARNING PTD

FIG. 7
<FIRST DIRECTION OF IMAGE CAPTURE>
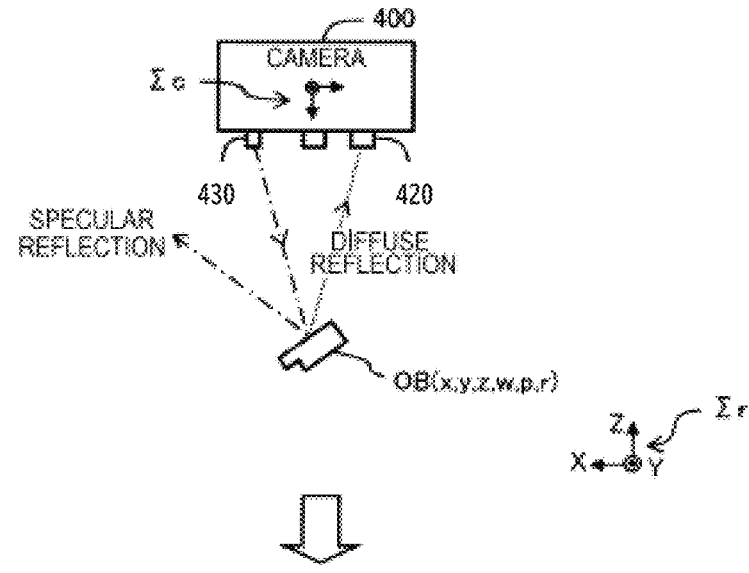
<SECOND DIRECTION OF IMAGE CAPTURE>
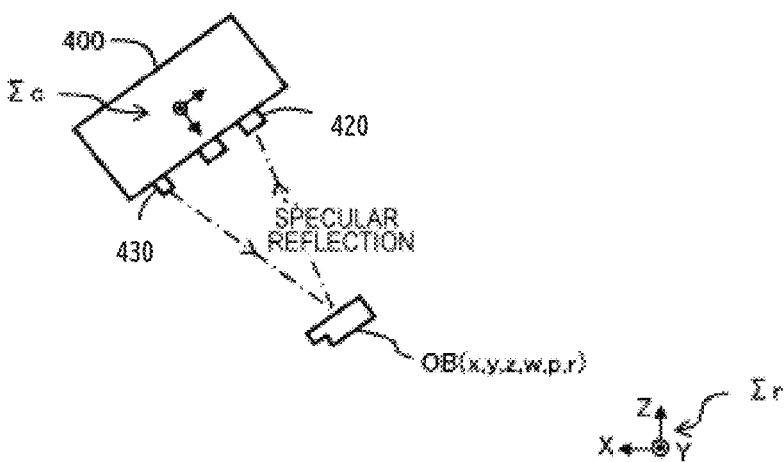

FIG. 9

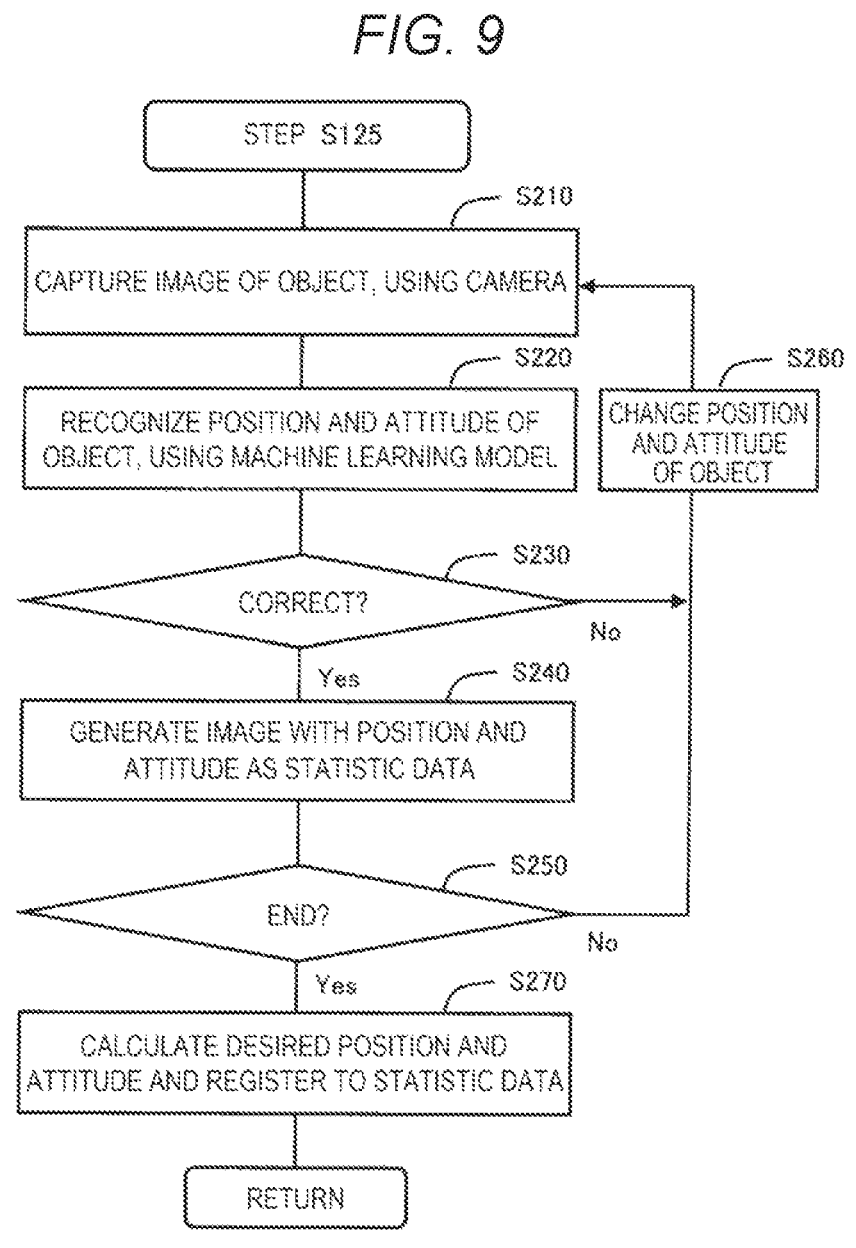

```
              ┌──────────────────┐
              │   STEP  S125     │
              └──────────────────┘
                       │ ╭─ S210
                       ▼
    ┌─────────────────────────────────────┐
    │ CAPTURE IMAGE OF OBJECT, USING CAMERA│◄──────┐
    └─────────────────────────────────────┘        │
                       │ ╭─ S220              ╭─ S260│
                       ▼                            │
    ┌─────────────────────────────┐    ┌──────────────────┐
    │ RECOGNIZE POSITION AND       │    │ CHANGE POSITION  │
    │ ATTITUDE OF OBJECT, USING    │    │ AND ATTITUDE     │
    │ MACHINE LEARNING MODEL       │    │ OF OBJECT        │
    └─────────────────────────────┘    └──────────────────┘
                       │ ╭─ S230                 ▲
                       ▼                          │
                  ╱─────────╲    No               │
                 ╱ CORRECT?  ╲───────────────────►│
                  ╲─────────╱                      │
                       │ Yes  ╭─ S240              │
                       ▼                           │
    ┌─────────────────────────────┐                │
    │ GENERATE IMAGE WITH POSITION │                │
    │ AND ATTITUDE AS STATISTIC DATA│               │
    └─────────────────────────────┘                │
                       │ ╭─ S250                    │
                       ▼                            │
                  ╱─────────╲    No                 │
                 ╱   END?    ╲────────────────────►─┘
                  ╲─────────╱
                       │ Yes  ╭─ S270
                       ▼
    ┌─────────────────────────────┐
    │ CALCULATE DESIRED POSITION   │
    │ AND ATTITUDE AND REGISTER    │
    │ TO STATISTIC DATA            │
    └─────────────────────────────┘
                       │
                       ▼
              ┌──────────────────┐
              │     RETURN       │
              └──────────────────┘
```

METHOD FOR GENERATING TRAINING DATA USED TO LEARN MACHINE LEARNING MODEL, SYSTEM, AND NON-TRANSITORY COMPUTER-READABLE STORAGE MEDIUM STORING COMPUTER PROGRAM

The present application is based on, and claims priority from JP Application Serial Number 2021-187668, filed Nov. 18, 2021, the disclosure of which is hereby incorporated by reference herein in its entirety.

BACKGROUND

1. Technical Field

The present disclosure relates to a method for generating training data used to learn a machine learning model, a system, and a non-transitory computer-readable storage medium storing a computer program.

2. Related Art

JP-A-2019-185239 discloses a technique of matching a feature of an object found from three-dimensional model data with a captured image of the object and thus recognizing the position and attitude of the object. JP-A-2020-87310 discloses a technique of recognizing the position and attitude of an object, using a machine learning model. Generally, when a machine learning model is applied to the recognition of the position and attitude of an object, training data using the position and attitude as a label is needed and the preparation to generate the training data takes significant time and effort. To cope with this, a method of generating training data by a simulation is used in JP-A-2020-87310.

To generate training data by a simulation, an image of an object is generated in connection with a certain scene and the label of position and attitude is assigned to the object in the scene. However, there is a difference between an image acquired from the simulation and an image acquired from the actual environment, posing a problem in that the accuracy of recognition of the position and attitude in the actual environment drops in a machine learning model learned with the training data generated by the simulation.

SUMMARY

According to a first aspect of the present disclosure, a method for generating training data used to learn a machine learning model for recognizing a position and attitude of an object is provided. The method includes: (a) executing prior learning of the machine learning model, using simulation data of the object; (b) capturing a first image of the object from a first direction of image capture, using a camera; (c) recognizing a first position and attitude of the object from the first image, using the machine learning model already learned through the prior learning; (d) performing a correctness determination about the first position and attitude; (e) capturing a second image of the object from a second direction of image capture that is different from the first direction of image capture, using the camera, when it is determined that the first position and attitude is correct, then converting the first position and attitude according to a change from the first direction of image capture to the second direction of image capture and thus calculating a second position and attitude, and assigning the second position and attitude to the second image and thus generating training data; and (f) changing an actual position and attitude of the object and repeating the (b) to (e).

According to a second aspect of the present disclosure, a system for generating training data used to learn a machine learning model for recognizing a position and attitude of an object is provided. The system includes a camera capturing an image of the object, and a training data generation unit generating the training data. The training data generation unit executes: (a) processing of executing prior learning of the machine learning model, using simulation data of the object; (b) processing of capturing a first image of the object from a first direction of image capture, using the camera; (c) processing of recognizing a first position and attitude of the object from the first image, using the machine learning model already learned through the prior learning; (d) processing of performing a correctness determination about the first position and attitude; (e) processing of capturing a second image of the object from a second direction of image capture that is different from the first direction of image capture, using the camera, then converting the first position and attitude according to a change from the first direction of image capture to the second direction of image capture and thus calculating a second position and attitude, and assigning the second position and attitude to the second image and thus generating training data; and (f) processing of changing an actual position and attitude of the object and repeating the processing (b) to (e).

According to a third aspect of the present disclosure, a non-transitory computer-readable storage medium storing a computer program causing a processor to execute processing of generating training data used to learn a machine learning model for recognizing a position and attitude of an object is provided. The computer program causes the processor to execute: (a) processing of executing prior learning of the machine learning model, using simulation data of the object; (b) processing of capturing a first image of the object from a first direction of image capture, using a camera; (c) processing of recognizing a first position and attitude of the object from the first image, using the machine learning model already learned through the prior learning; (d) processing of performing a correctness determination about the first position and attitude; (e) processing of capturing a second image of the object from a second direction of image capture that is different from the first direction of image capture, using the camera, then converting the first position and attitude according to a change from the first direction of image capture to the second direction of image capture and thus calculating a second position and attitude, and assigning the second position and attitude to the second image and thus generating training data; and (f) processing of changing an actual position and attitude of the object and repeating the processing (b) to (e).

BRIEF DESCRIPTION OF THE DRAWINGS

FIG. 1 is an explanatory view showing the configuration of a robot system according to an embodiment.

FIG. 4 is a flowchart showing overall procedures of processing in a first embodiment.

FIG. 5 is an explanatory view showing processing of generating training data for prior learning by a simulation.

FIG. 7 is an explanatory view showing how the direction of image capture is changed in the first embodiment.

FIG. 9 is a flowchart showing detailed procedures of step S125 in the second embodiment.

DESCRIPTION OF EXEMPLARY EMBODIMENTS

A. First Embodiment

Figure 1:
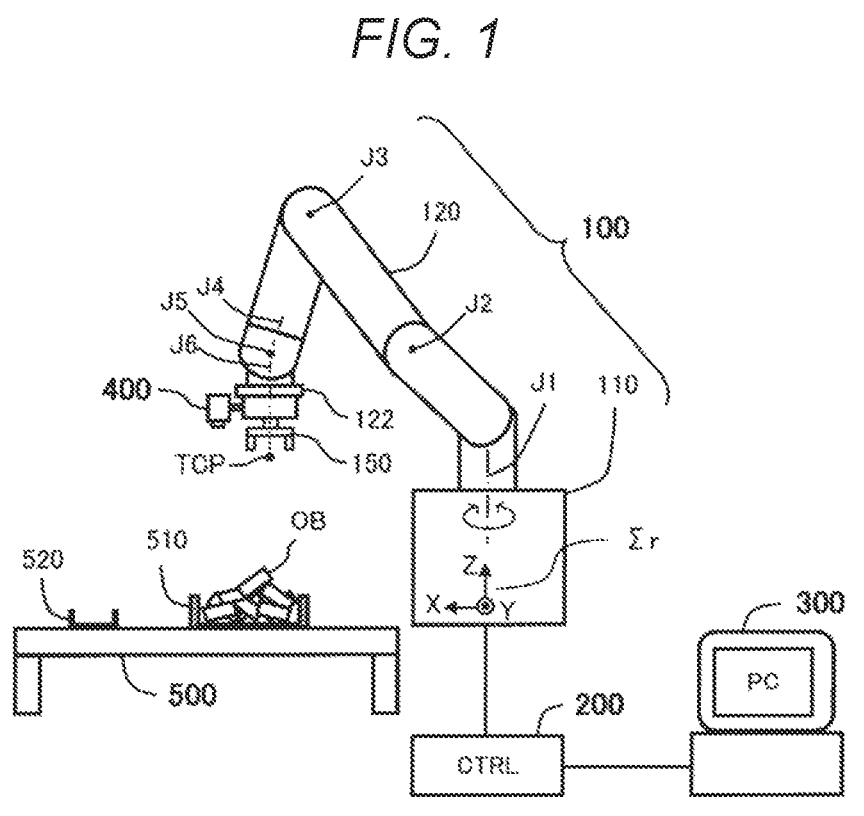
Figure 2:
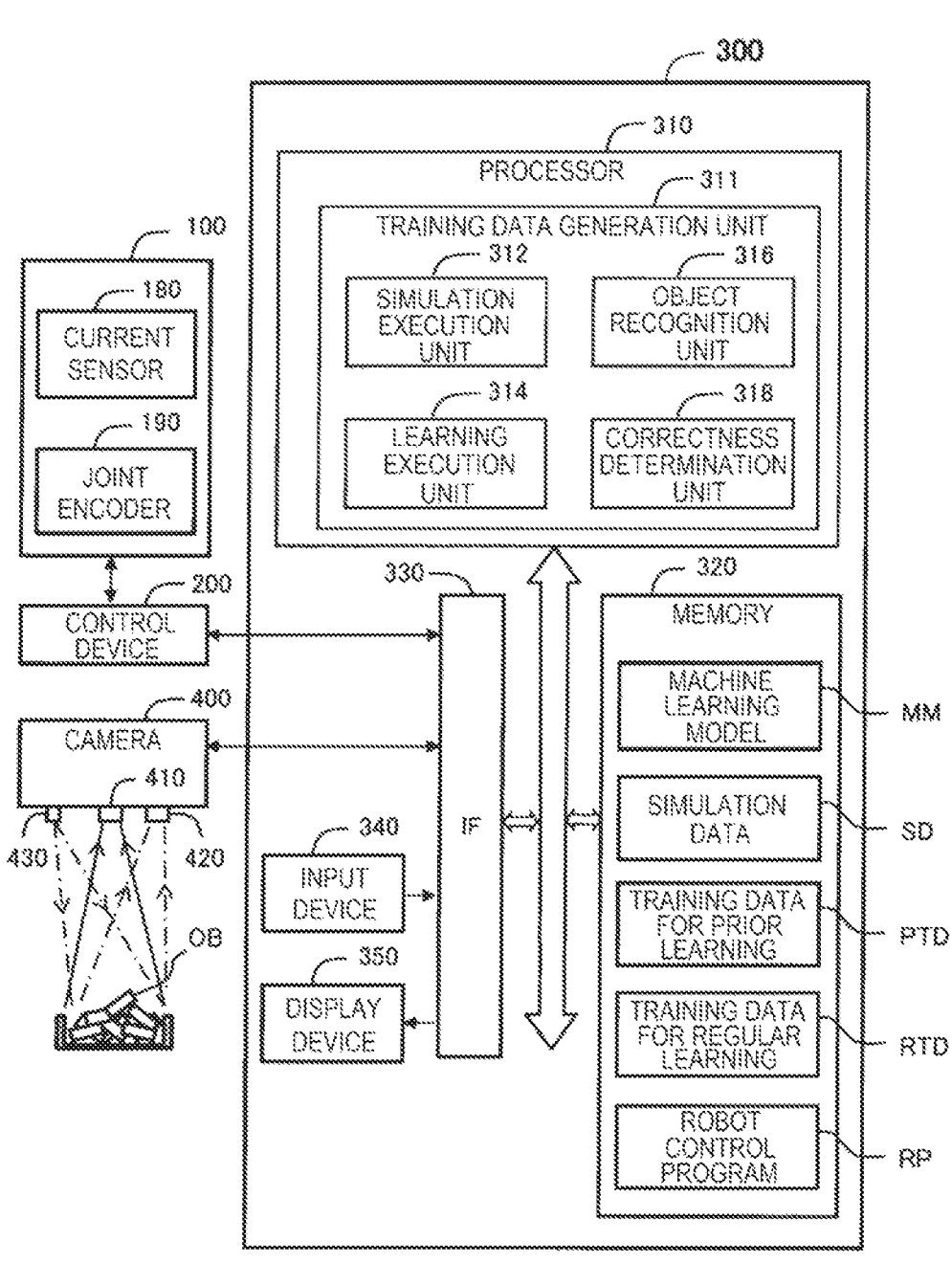
FIG. 2 is a functional block diagram of an information processing device according to an embodiment.

FIG. 1 is an explanatory view showing an example of a robot system according to an embodiment. This robot system has a robot 100, a control device 200 controlling the robot 100, an information processing device 300, a camera 400, and a stand 500. The information processing device 300 is a personal computer, for example. In FIG. 1, three axes X, Y, and Z prescribing an orthogonal coordinate system in a three-dimensional space are illustrated. The X-axis and the Y-axis are axes in a horizontal direction. The Z-axis is an axis in a vertical direction. These X, Y, and Z-axes are coordinate axes of a robot coordinate system $\Sigma r$ having the origin at a predetermined position on the robot 100.

The robot 100 has a base 110 and a robot arm 120. A hand 150 as an end effector is installed at an arm end 122, which is a distal end part of the robot arm 120. The hand 150 can be implemented as a gripper or a suction pad that can grip an object OB. At a distal end part of the hand 150, a TCP (tool center point) as a control point of the robot 100 is set. The control point TCP can be set at any position.

The robot arm 120 is formed of parts sequentially coupled via six joints J1 to J6. Of these joints J1 to J6, three joints J2, J3, J5 are bending joints and the other three joints J1, J4, J6 are torsional joints. While a six-axis robot is described as an example in this embodiment, a robot having any robot arm mechanism having one or more joints can be used. Also, while the robot 100 in this embodiment is a vertical articulated robot, a horizontal articulated robot may be used.

A first tray 510 and a second tray 520 are installed at the stand 500. In the first tray 510, a plurality of objects OB are loaded in bulk. The second tray 520 is used as a place where an object OB taken out of the first tray 510 is placed. The robot 100 executes the work of taking an object OB out of the first tray 510 and placing the object OB in the second tray 520.

At a distal end part of the robot arm 120, the camera 400 capturing an image of the object OB in the first tray 510 is installed. The image captured by the camera 400 is used to find the three-dimensional position and attitude of the object OB. The three-dimensional position and attitude is hereinafter referred to as "position and attitude". As the camera 400, for example, an RGBD camera or a stereo camera can be used. The RGBD camera is a camera having an RGB camera capturing an RGB image and a D camera capturing a depth image. A monochrome camera capturing a gray image may be used instead of the RGB camera. Also, a single-lens camera can be used as the camera 400. The camera 400 need not be installed at the robot arm 120 and may be installed separately from the robot 100. However, installing the camera 400 at the robot arm 120 is advantageous in that the direction of image capture of the object OB by the camera 400 can be easily changed.

FIG. 2 is a block diagram showing functions of the information processing device 300. The information processing device 300 has a processor 310, a memory 320, an interface circuit 330, and an input device 340 and a display device 350 that are coupled to the interface circuit 330. Also, the control device 200 and the camera 400 are coupled to the interface circuit 330. The results of measurement by a current sensor 180 and a joint encoder 190 of the robot 100 are supplied to the information processing device 300 via the control device 200. The current sensor 180 is a sensor measuring the current of a motor provided for each joint of the robot 100. The joint encoder 190 is a sensor detecting the operating position of each joint.

In this embodiment, the camera 400 has a first camera 410 capturing a two-dimensional image such as an RGB image or a gray image, a second camera 420 capturing a depth image, and an illumination unit 430 casting illumination light for the second camera 420. The illumination unit 430 is a projector casting an infrared pattern for capturing a depth image.

The processor 310 has the functions of a training data generation unit 311 generating training data used to learn a machine learning model for recognizing the position and attitude of the object OB. The training data generation unit 311 includes the functions of a simulation execution unit 312, a learning execution unit 314, an object recognition unit 316, and a correctness determination unit 318. The simulation execution unit 312 executes processing of simulating a scene where the object OB exists in the first tray 510 and thus generating training data for prior learning of a machine learning model. The learning execution unit 314 executes prior learning and regular learning of a machine learning model. The object recognition unit 316 executes processing of recognizing the position and attitude of the object OB from an image captured by the camera 400, using an already learned machine learning model. The correctness determination unit 318 executes a determination about whether the position and attitude of the object OB recognized using the machine learning model is correct or incorrect. The functions of the training data generation unit 311 are implemented by the processor 310 executing a computer program stored in the memory 320. However, a part or all of the functions of the training data generation unit 311 may be implemented by a hardware circuit.

In the memory 320, a machine learning model MM to recognize the position and attitude of the object OB, simulation data SD, training data for prior learning PTD, training data for regular learning RTD, and a robot control program RP are stored. The simulation data SD is data used to simulate a scene where objects OB are loaded in bulk in the first tray 510, and includes CAD data, which is three-dimensional model data of the object OB, robot data representing the position and shape of the robot 100, and a camera parameter of the camera 400. The robot control program RP is formed of a plurality of commands causing the robot 100 to operate.

Figure 3:
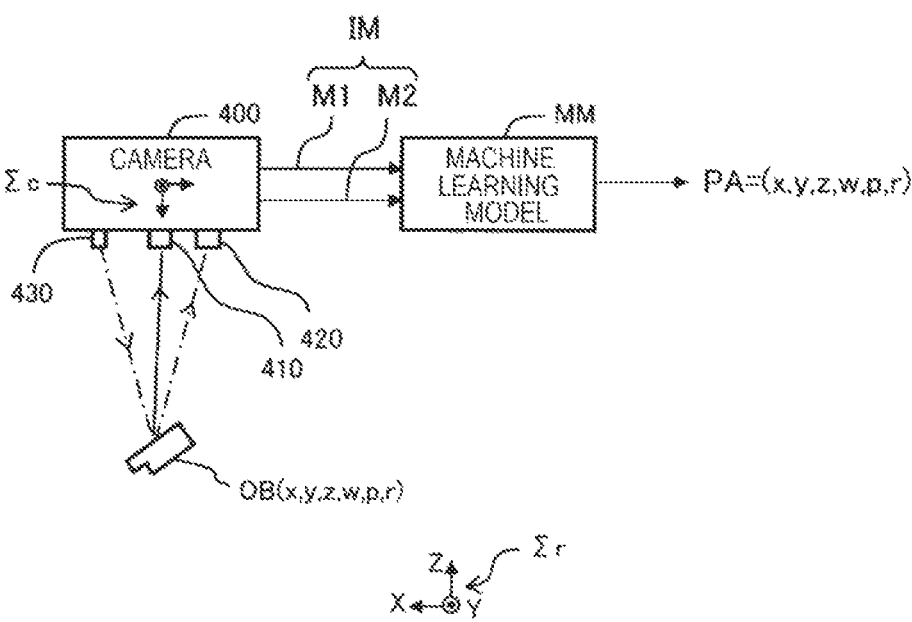
FIG. 3 is an explanatory view showing a recognition function for the position and attitude of an object, based on a machine learning model.

FIG. 3 is an explanatory view showing a recognition function for the position and attitude of the object OB, based on the machine learning model MM. The camera 400 is calibrated in advance. The relative relationship between a camera coordinate system $\Sigma c$ and the robot coordinate system $\Sigma r$ is known. The camera 400 captures an image of the object OB and thus generates a two-dimensional image M1 and a depth image M2. Hereinafter, these images M1, M2 are collectively referred to as an "image IM". The machine learning model MM is a regression model outputting a position and attitude PA of the object OB in response to the input of the image IM. The position and attitude PA is expressed, for example, by a position (x, y, z) and an attitude (w, p, r) in the robot coordinate system Σr. The attitude is expressed by angles of rotation (w, p, r) about the three axes.

With respect to which object to be used as a target for recognizing the position and attitude PA, of a plurality of objects loaded in bulk, the following three patterns are conceivable:

(A1) use only the object at the top;

(A2) use not only the object at the top but also an object partly overlapping another object, specifically, for example, an object whose area is hidden at a rate of 20% or less; and (A3) use all the objects.

Considering the actual work of picking up objects loaded in bulk, it is preferable to generate training data so as to be able to recognize the position and attitude, using the object defined in the above (A2). In this case, with respect to the bulk load state generated in the simulation, an image to which the positions and attitudes of a plurality of objects satisfying the above (A2) condition are assigned as labels is generated as a training data set. However, in the description below, for the convenience of the description, it is assumed that the machine learning model MM recognizes the position and attitude PA of only one object OB according to the above (A1).

FIG. 4 is a flowchart showing overall procedures of processing in the first embodiment. In step S110, the simulation execution unit 312 generates training data for prior learning by a simulation.

FIG. 5 is an explanatory view showing the processing of generating training data for prior learning by a simulation. The simulation execution unit 312 inputs simulation data SD including CAD data of the object OB as a recognition target and various parameters, into a scene simulator SS. The scene simulator SS drops, for example, the object OB expressed by the CAD data randomly a plurality of times from a certain height by a physical simulation and thus generates a scene of the bulk load state. The position and attitude of the objects OB loaded in bulk is known because this is a simulation. The simulation execution unit 312 renders this scene, based on camera information set by various parameters, and thus generates the image IM including the two-dimensional image M1 and the depth image M2. The simulation execution unit 312 assigns the position and attitude of the object OB as a label to the image IM and thus generates the training data for prior learning PTD. Generating a plurality of scenes of the bulk load enables the generation of a large number of training data for prior learning PTD. In this embodiment, the bulk load state of objects OB is simulated. However, other states than the bulk load state, for example, a state where one object OB is placed in any position and attitude in the tray 510 may be simulated.

In step S120, the learning execution unit 314 executes prior learning of the machine learning model MM, using the training data for prior learning PTD.

In step S130, the training data generation unit 311 generates the training data for regular learning RTD, taking specular reflection light from the object OB into account. The specular reflection light from the object OB is taken into account for the reason given below. That is, in the simulation executed in step S110, it is difficult to accurately reproduce the image IM captured in the state where the specular reflection light from the object OB enters the camera 400 in the actual environment. Therefore, in the machine learning model MM learned with the training data for prior learning, the accuracy of recognition of the position and attitude of the object OB tends to drop with respect to the state where the specular reflection light enters the camera 400 in the actual environment. Particularly when the object OB is a glossy object, it is difficult to accurately reflect the state of reflection of light in the simulation and therefore the accuracy of recognition tends to drop significantly. To cope with this, in step S130, the training data for regular learning is generated with respect to the state where the camera 400 receives the specular reflection light from the object OB.

Figure 6:
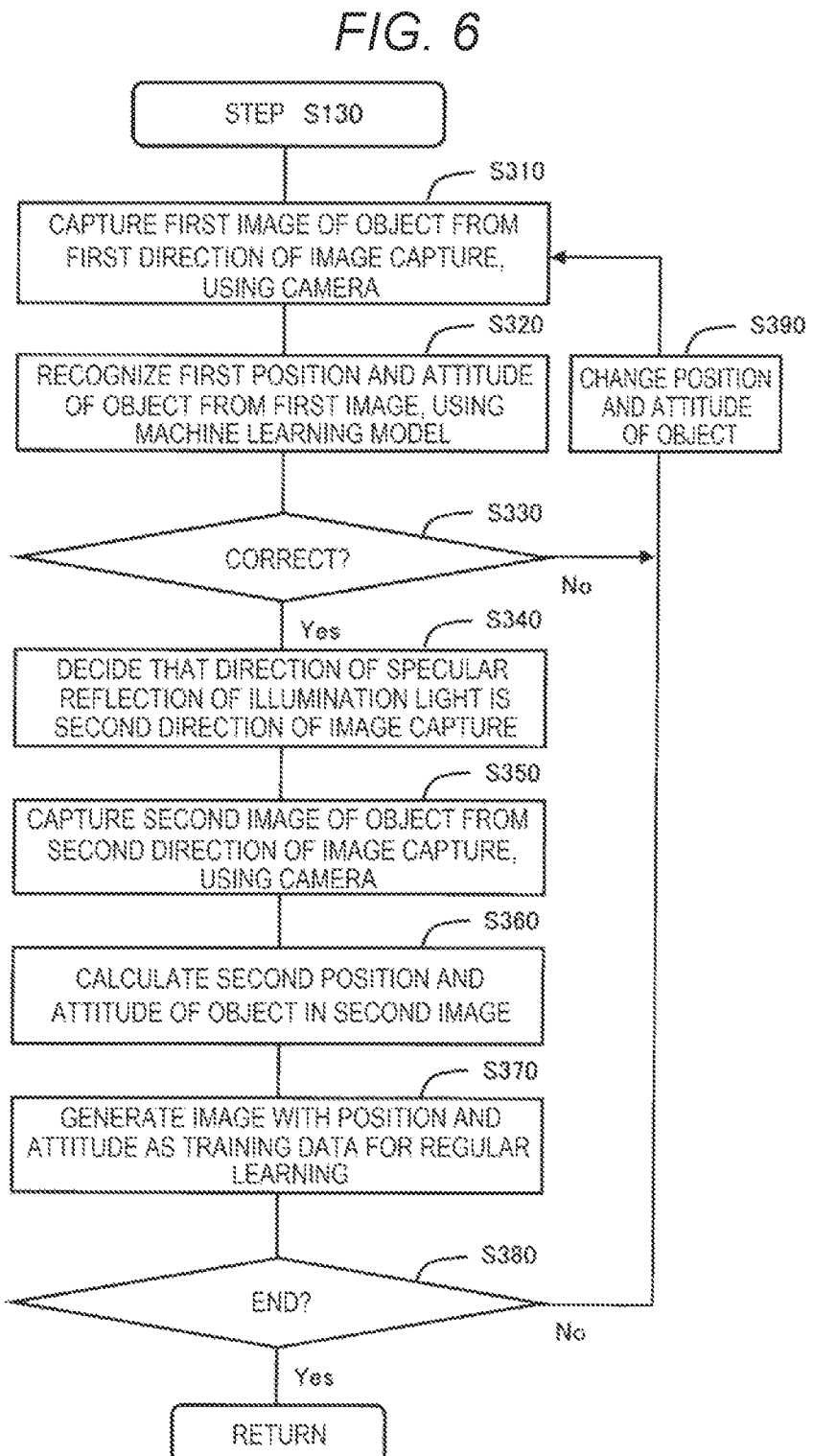
FIG. 6 is a flowchart showing detailed procedures of step S130 in the first embodiment.

FIG. 6 is a flowchart showing detailed procedures of step S130. In step S310, the training data generation unit 311 captures a first image of the objects OB loaded in bulk, using the camera 400. The "first image" includes the two-dimensional image M1 and the depth image M2 shown in FIG. 3. The direction of image capture by the camera 400 in this case is referred to as a "first direction of image capture".

In step S320, the object recognition unit 316 recognizes a first position and attitude of the object OB from the first image, using the machine learning model MM already learned through the prior learning. In step S330, the correctness determination unit 318 determines whether the result of the recognition is correct or incorrect. This correctness determination can be executed, for example, using a reliability score. For the reliability score, a simulation image of the object OB in the first position and attitude is generated by a simulation using the recognized first position and attitude of the object OB, and the reliability score can be calculated as an indicator expressing the degree to which this simulation image and the first image captured by the camera 400 coincide with each other. For example, a reliability score RS is calculated by the following equation:

$$RS = \alpha \times S1 + (1-\alpha) \times S2 \qquad (1).$$

In this equation, $\alpha$ is a coefficient satisfying $0 \leq \alpha \leq 1$. S1 is the degree of similarity between the two-dimensional image included in the simulation image and the two-dimensional image included in the first image. S2 is the degree of similarity between the depth image included in the simulation image and the depth image included in the first image. The degrees of similarity S1, S2 can be calculated as the degree of image similarity or the degree of cosine similarity. The above equation (1) can calculate the reliability score RS by weighted summing of the degrees of similarity S1, S2.

The correctness determination unit 318 compares the reliability score RS with a preset reliability threshold and thus determines whether the result of the recognition is correct or incorrect. That is, when the reliability score RS is equal to or higher than the reliability threshold, the correctness determination unit 318 determines that the result of the recognition is correct. When the reliability score RS is lower than the reliability threshold, the correctness determination unit 318 determines that the result of the recognition is incorrect. As another method, for example, the contours of the object OB in the simulation image and the first image may be displayed as superimposed on each other on the display device 350 and a user may be made to determine whether the result of the recognition is correct or incorrect. When the result of the recognition is correct, the processing proceeds to step S340, which will be described later. Meanwhile, when the result of the recognition is incorrect, the processing proceeds to step S390 and the actual position and attitude of the object OB is changed. Then, the processing returns to step S310. The position and attitude of the object OB is changed, for example, by the user reloading the object OB in bulk.

In step S340, the training data generation unit 311 decides that the direction of specular reflection of the illumination light is a second direction of image capture. In step S350, an image of the object OB is captured from the second direction of image capture, using the camera 400, and a second image is thus generated.

FIG. 7 is an explanatory view showing how the direction of image capture is changed in the first embodiment. The top part of FIG. 7 shows a state where an image of the object OB is captured from the first direction of image capture in step S310. In this state, diffuse reflection light of illumination light for the second camera 420 emitted from the illumination unit 430 enters the second camera 420. The depth image captured by the second camera 420 is an image acquired from this diffuse reflection light. In step S340, the position and attitude of the camera 400 is changed in such a way that specular reflection light of the illumination light from the illumination unit 430 enters the second camera 420, as shown in the bottom part of FIG. 7. Since the direction of emission of the illumination light from the illumination unit 430 is known, the direction of the specular reflection light from the object OB can be calculated if the position and attitude of the object OB is known. Also, the change in the position and attitude of the camera 400 can be executed by moving the robot arm 120. As described above, in a simulation, it is difficult to accurately reproduce an image captured in the state where the specular reflection light from the object OB enters the camera 400 in the actual environment and this trend is conspicuous particularly when the object OB is a glossy object. Therefore, in step S340, the second direction of image capture is decided in such a way that the specular reflection light from the object OB enters the camera 400 in the actual environment. If training data is generated using an image captured from this second direction of image capture, training data that is difficult to generate by a simulation can be acquired.

In the example shown in FIG. 7, the state where the specular reflection light from the object OB enters the second camera 420 for depth image is decided as the second direction of image capture. However, instead of this, a state where the specular reflection light from the object OB enters the first camera 410 for two-dimensional image may be decided as the second direction of image capture. The latter case can be executed if the position of an illumination light source for two-dimensional image is known. Also, image capture may be performed, setting each of the state where the specular reflection light from the object OB enters the first camera 410 and the state where the specular reflection light from the object OB enters the second camera 420, as the second direction of image capture.

In step S360, the training data generation unit 311 calculates a second position and attitude of the object OB in the second image. The second position and attitude can be calculated according to the following equation:

$$Pb = {}^{B}H_A \times Pa \tag{2}$$

In this equation, Pb is a 4×4 matrix representing the second position and attitude. Pa is a 4×4 matrix representing the first position and attitude. ${}^{B}H_A$ is a homogeneous transformation matrix representing a transformation from the first position and attitude Pa to the second position and attitude Pb. This matrix ${}^{B}H_A$ is the same as a matrix representing a transformation from the first direction of image capture Da to the second direction of image capture Db of the camera 400. In other words, the second position and attitude Pb is calculated by performing, to the first position and attitude Pa, a transformation corresponding to a change from the first direction of image capture Da to the second direction of image capture Db.

In step S370, the training data generation unit 311 generates an image with a position and attitude as the training data for regular learning. That is, the second position and attitude is assigned as a label to the second image captured in step S350, thus generating the training data for regular learning. At this time, the first position and attitude may be assigned as a label to the first image captured in step S310, thus adding to the training data for regular learning.

In step S380, the training data generation unit 311 determines whether a planned number of training data for regular learning is acquired or not. When a sufficient number of training data is not acquired, the processing proceeds to step S390 and the actual position and attitude of the object OB is changed. Then, the processing returns to step S310 and the foregoing steps S310 to S380 are executed again. Meanwhile, when a sufficient number of training data is acquired, the processing in FIG. 6 ends.

When the processing of step S130 shown in FIG. 6 ends, the learning execution unit 314 in step S140 in FIG. 4 executes regular learning of the machine learning model MM, using the training data for regular learning generated in step S130. In the regular learning, not only the training data generated in step S130 but also the training data for prior learning generated in step S110 may be used. In step S150, the work of the robot 100 is executed, utilizing the recognition of the object OB based on the machine learning model MM already learned through the regular learning. This work is executed according to the robot control program RP that is generated in advance.

As described above, in the first embodiment, the first position and attitude of the object OB is recognized from the first image, using the machine learning model MM already learned through the prior learning. When it is determined that the first position and attitude is correct, the second image is captured from the second direction of image of capture that is different from the first direction of image capture, using the camera. The second position and attitude of the object OB is assigned to the second image, thus generating the training data for regular learning. Consequently, the training data for performing machine learning can be easily generated in the actual environment and the difference between the simulation and the actual environment can be compensated for. Therefore, the performance of the machine learning model MM can be improved. Also, in the first embodiment, the second direction of image capture is set in the direction of specular reflection and therefore training data for correctly recognizing the position and attitude of a glossy object can be generated.

B. Second Embodiment

Figure 8:
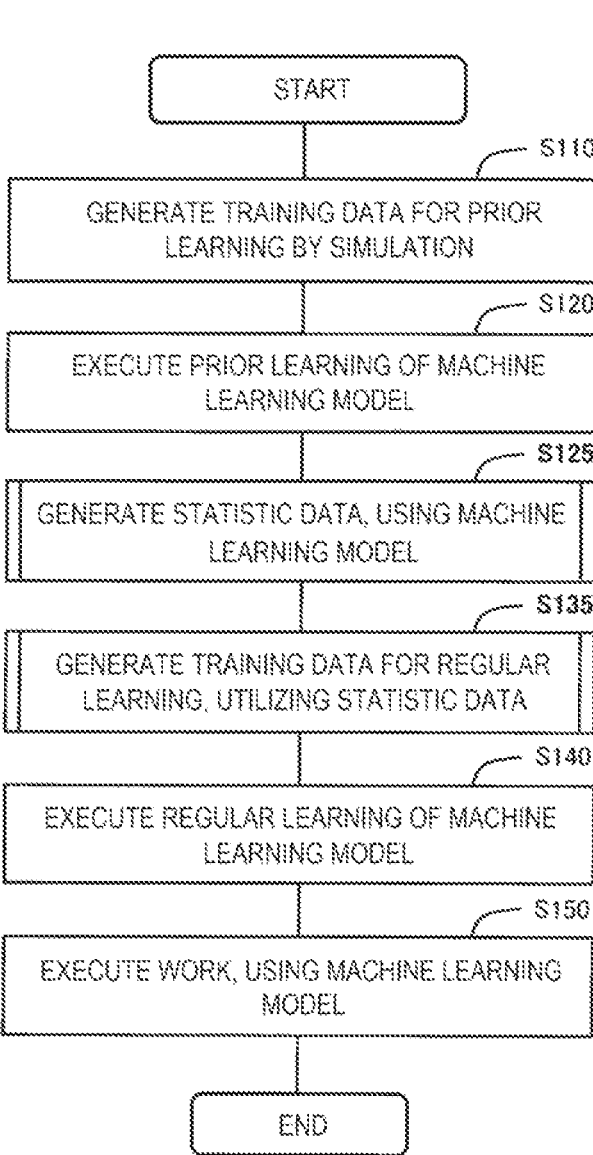
FIG. 8 is a flowchart showing overall procedures of processing in a second embodiment.

FIG. 8 is a flowchart showing overall procedures of processing in a second embodiment. The second embodiment differs from the first embodiment shown in FIG. 4 only in that step S125 is added and that step S130 is replaced with step S135. The other steps in the second embodiment are the same as in the first embodiment. The configurations of the devices in the second embodiment are the same as in the first embodiment.

In step S125, the training data generation unit 311 generates statistic data, using the machine learning model MM already learned through the prior learning. This statistic data is data utilized for deciding the second direction of image capture.

FIG. 9 is a flowchart showing detailed procedures of step S125. In step S210, the training data generation unit 311 captures an image of the object OB loaded in bulk, using the camera 400. This image includes the two-dimensional image M1 and the depth image M2 shown in FIG. 3. In step S220, the object recognition unit 316 recognizes the position and attitude of the object OB from the image acquired in step S210, using the machine learning model MM already learned through the prior learning. In step S230, the correctness determination unit 318 determines whether the result of the recognition is correct or incorrect. This correctness determination can be executed using the reliability score, as in step S330 shown in FIG. 6. When the result of the recognition is correct, the processing proceeds to step S240, which will be described later. Meanwhile, when the result of the recognition is incorrect, the processing proceeds to step S260 and the actual position and attitude of the object OB is changed. Then, the processing returns to step S210. The position and attitude of the object OB is changed, for example, by the user reloading the object OB in bulk.

In step S240, the training data generation unit 311 generates an image with a position and attitude as statistic data. That is, the training data generation unit 311 assigns the position and attitude recognized in step S220 to the image captured in step S210 and thus generates statistic data. In step S250, the training data generation unit 311 determines whether a planned number of statistic data is acquired or not. When a sufficient number of statistic data is not acquired, the processing proceeds to step S260 and the actual position and attitude of the object OB is changed. Then, the processing returns to step S210 and the foregoing steps S210 to S250 are executed again. Meanwhile, when a sufficient number of statistic data is acquired, the processing proceeds to step S270.

In step S270, the training data generation unit 311 calculates a desired position and attitude with reference to the statistic data and registers the desired position and attitude to the statistic data.

Figure 10:
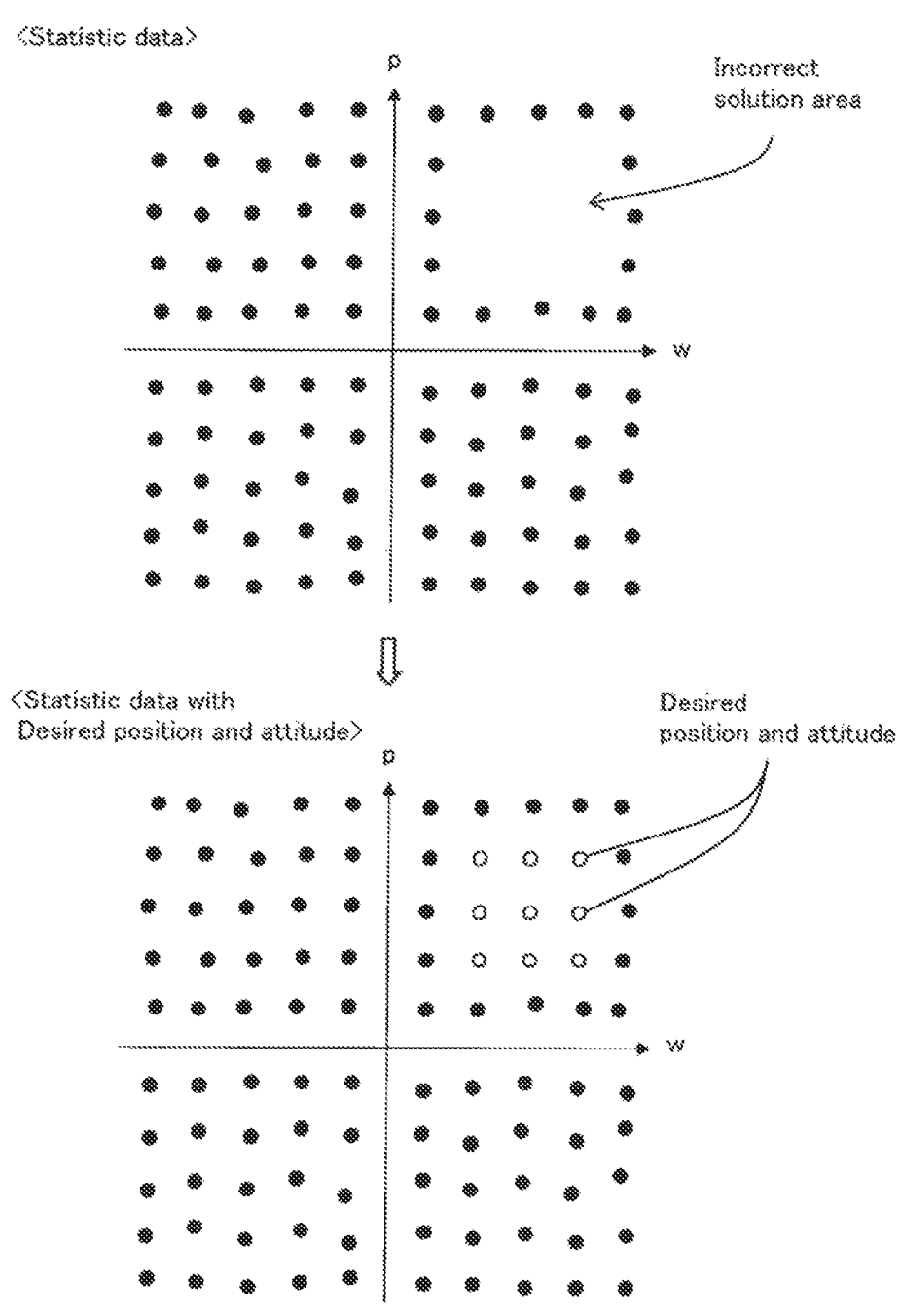
FIG. 10 is an explanatory view showing a method for deciding a second direction of image capture, using statistic data.

FIG. 10 is an explanatory view showing the desired position and attitude in the statistic data. The "desired position and attitude" is an attitude that is not included in the statistic data generated by the processing of steps S210 to S260. The top part of FIG. 10 shows a two-dimensional illustration of only the angle of rotation (w, p) of the position and attitude (x, y, z, w, p, r) included in the statistic data. Ideally, the position and attitude should be included substantially evenly in the statistic data. However, the position and attitude determined as incorrect in step S230 in FIG. 9 is not included in the statistic data. In the illustration at the top of FIG. 10, a black dot indicates a position and attitude determined as correct and included in the statistic data. In an incorrect solution area, a position and attitude determined as correct is missing. The training data generation unit 311 recognizes one or more positions and attitudes as the "desired position and attitude" in this incorrect solution area and registers the desired position and attitude to the statistic data. The illustration at the bottom of FIG. 10 shows a state where the desired position and attitude is added as a white dot. The "desired position and attitude" can be found, for example, by making an analysis in which, when a sphere that is omnidirectional in relation to the object OB is divided into predetermined areas and the position and attitude included in the statistic data is mapped thereon, it is recognized that there are few results of recognition in a particular area. The desired position and attitude is considered to be a position and attitude that cannot be accurately recognized based on the machine learning model MM already learned through the prior learning by a simulation, and a position and attitude where there is a large difference between the image in the simulation and the image in the reality. To cope with this, in the incorrect solution area, where the position and attitude determined as correct in the statistic data is missing, one or more positions and attitudes are registered as the "desired position and attitude". Thus, an appropriate position and attitude for compensating for the difference between the simulation and the reality can be efficiently gathered.

When the processing of step S125 thus ends, the processing proceeds to step S135 in FIG. 8 and the training data generation unit 311 generates the training data for regular learning, utilizing the statistic data.

Figure 11:
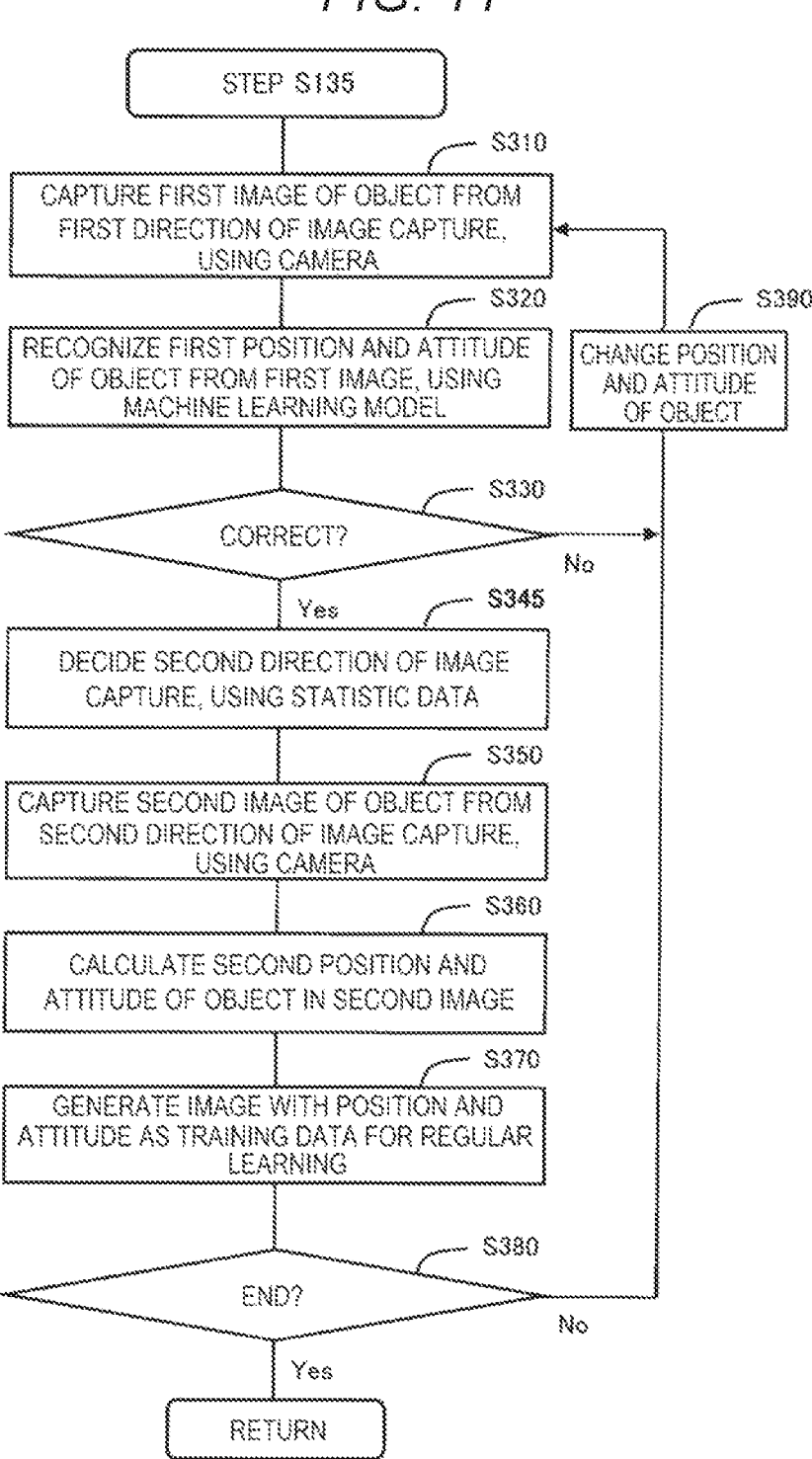
FIG. 11 is a flowchart showing detailed procedures of step S135 in the second embodiment.

FIG. 11 is a flowchart showing detailed procedures of step S135. The procedures in FIG. 11 include step S345 instead of step S340 in the detailed procedures of step S130 shown in FIG. 6 in the first embodiment. The other steps in the procedures are the same as in FIG. 6.

In step S345, the training data generation unit 311 decides the second direction of image capture, using the statistic data. The second direction of image capture is a direction of image capture corresponding to the desired position and attitude described with reference to FIG. 10. When a plurality of desired positions and attitudes exist, a direction of image capture in which any position and attitude can be achieved, of the plurality of desired positions and attitudes, can be employed as the second direction of image capture. For example, a direction of image capture in which the nearest desired position and attitude to the first position and attitude is achieved can be employed as the second direction of image capture. Also, two or more second directions of image capture may be decided, based on one first position and attitude. In step S350, an image of the object OB is captured from the second direction of image capture, using the camera 400, and the second image is thus generated. The processing from step S350 onward is the same as in the first embodiment.

The second direction of image capture decided in step S345 in the second embodiment is such a direction that the position and attitude recognized by the machine learning model MM already learned through the prior learning is not determined as correct. As the second direction of image capture is thus set in such a direction that the position and attitude is not determined as correct by the machine learning model MM already learned through the prior learning by a simulation, training data compensating for the difference between the simulation and the actual environment can be generated.

As described above, in the second embodiment, as in the first embodiment, the first position and attitude of the object OB is recognized from the first image, using the machine learning model MM already learned through the prior learning. When it is determined that the first position and attitude is correct, the second image is captured from the second direction of image capture that is different from the first direction of image capture, using the camera. The second position and attitude of the object OB is assigned to the second image, thus generating the training data for regular learning. Consequently, the training data for performing machine learning can be easily generated in the actual environment and the difference between the simulation and the actual environment can be compensated for. Therefore, the performance of the machine learning model MM can be improved. Also, in the second embodiment, the second direction of image capture is set in such a direction that the position and attitude is not determined as correct by the machine learning model MM already learned through the prior learning. Therefore, training data compensating for the difference between the simulation and the actual environment can be generated.

In the first embodiment and the second embodiment, it is supposed that an object is recognized in work using the robot 100. However, the present disclosure can also be applied to a case where an object is recognized in a system that does not use a robot.

Other Aspects

The present disclosure is not limited to the foregoing embodiments and can be implemented in various other aspects without departing from the spirit and scope of the present disclosure. For example, the present disclosure can be implemented in the aspects given below. A technical feature in the embodiments corresponding to a technical feature in the aspects described below can be suitable replaced or combined in order to solve a part or all of the problems of the present disclosure or in order to achieve a part or all of the effects of the present disclosure. Also, the technical feature can be suitably deleted unless described as essential in the specification.

(1) According to a first aspect of the present disclosure, a method for generating training data used to learn a machine learning model for recognizing a position and attitude of an object is provided. The method includes: (a) executing prior learning of the machine learning model, using simulation data of the object; (b) capturing a first image of the object from a first direction of image capture, using a camera; (c) recognizing a first position and attitude of the object from the first image, using the machine learning model already learned through the prior learning; (d) performing a correctness determination about the first position and attitude; (e) capturing a second image of the object from a second direction of image capture that is different from the first direction of image capture, using the camera, when it is determined that the first position and attitude is correct, then converting the first position and attitude according to a change from the first direction of image capture to the second direction of image capture and thus calculating a second position and attitude, and assigning the second position and attitude to the second image and thus generating training data; and (f) changing an actual position and attitude of the object and repeating the (b) to (e).

This method can easily generate training data for machine learning in the actual environment and can compensate for the difference between the simulation and the actual environment. Therefore, the performance of the machine learning mode can be improved.

(2) In the method, the (e) may include: (e1) finding a direction of specular reflection from the object, based on a direction of emission of illumination light onto the object and the first position and attitude; and (e2) setting the direction of specular reflection as the second direction of image capture.

In this method, the second direction of image capture is set in the direction of specular reflection. Therefore, training data for correctly recognizing the position and attitude of a glossy object can be generated.

(3) In the method, the second direction of image capture may be set in such a direction that the position and attitude recognized by the machine learning model already learned through the prior learning using the image captured from the second direction of image capture is not determined as correct.

In this method, the second direction of image capture is set in such a direction that the position and attitude is not determined as correct by the machine learning model already learned through the prior learning by a simulation. Therefore, training data compensating for the difference between the simulation and the actual environment can be generated.

(4) The method may include: executing, a plurality of times, processing of recognizing the position and attitude of the object and performing the correctness determination using the machine learning model already learned through the prior learning, and then registering a history of the position and attitude determined as correct, before the (b) to (f). The second direction of image capture may be set in such a direction that a position and attitude with no history of being determined as correct is achieved.

In this method, the second direction of image capture is set in such a direction that there is no history of a position and attitude determined as correct by the machine learning model already learned through the prior learning using simulation data. Therefore, training data compensating for the difference between the simulation and the actual environment can be generated.

(5) In the method, the (d) may include: (d1) generating a simulation image of the object in the first position and attitude by a simulation; (d2) calculating a reliability score of the first position and attitude, using the first image and the simulation image; and (d3) comparing the reliability score with a threshold and thus determining whether the first position and attitude is correct or incorrect.

This method can determine whether the first position and attitude is correct or incorrect, based on the reliability score calculated according to the first image and the simulation image.

(6) According to a second aspect of the present disclosure, a system for generating training data used to learn a machine learning model for recognizing a position and attitude of an object is provided. The system includes a camera capturing an image of the object, and a training data generation unit generating the training data. The training data generation unit executes: (a) processing of executing prior learning of the machine learning model, using simulation data of the object; (b) processing of capturing a first image of the object from a first direction of image capture, using the camera; (c) processing of recognizing a first position and attitude of the object from the first image, using the machine learning model already learned through the prior learning; (d) processing of performing a correctness determination about the first position and attitude; (e) processing of capturing a second image of the object from a second direction of image capture that is different from the first direction of image capture, using the camera, then converting the first position and attitude according to a change from the first direction of image capture to the second direction of image capture and thus calculating a second position and attitude, and assigning the second position and attitude to the second image and thus generating training data; and (f) processing of changing an actual position and attitude of the object and repeating the processing (b) to (e).

(7) According to a third aspect of the present disclosure, a non-transitory computer-readable storage medium storing a computer program causing a processor to execute processing of generating training data used to learn a machine learning model for recognizing a position and attitude of an object is provided. The computer program causes the processor to execute: (a) processing of executing prior learning of the machine learning model, using simulation data of the object; (b) processing of capturing a first image of the object from a first direction of image capture, using a camera; (c) processing of recognizing a first position and attitude of the object from the first image, using the machine learning model already learned through the prior learning; (d) processing of performing a correctness determination about the first position and attitude; (e) processing of capturing a second image of the object from a second direction of image capture that is different from the first direction of image capture, using the camera, then converting the first position and attitude according to a change from the first direction of image capture to the second direction of image capture and thus calculating a second position and attitude, and assigning the second position and attitude to the second image and thus generating training data; and (f) processing of changing an actual position and attitude of the object and repeating the processing (b) to (e).

The present disclosure can also be implemented in various other aspects than the above. For example, the present disclosure can be implemented in aspects such as a robot system having a robot and a robot control device, a computer program for implementing a function of a robot control device, and a non-transitory storage medium recording the computer program.

What is claimed is:

1. A method for generating training data used to learn a machine learning model for recognizing a position and attitude of a first object of a plurality of objects handled by a robot, the plurality of objects being loaded in bulk on a base, the method comprising:

(a) executing prior learning of the machine learning model, using simulation data of the plurality of objects loaded in bulk on the base;

(b) capturing a first image of the plurality of objects from a first direction of image capture, using a camera, the first image including a first two-dimensional image and a first depth image, the first depth image being acquired in a diffused reflection light condition in which the camera captures diffuse reflection light that is formed by reflecting, along the first direction of image capture, illumination light from a illumination light source at the plurality of objects;

(c) identifying the first object based on the first image and recognizing a first position and attitude of the first object from the first image, using the machine learning model already learned through the prior learning, the first object being overlapped by another object of the plurality of objects by an overlapping amount, the overlapping amount being 20% or less of an area of the first object being overlapped by the another object;

(d) performing a correctness determination about the first position and attitude;

(e) capturing a second image of the first object from a second direction of image capture that is different from the first direction of image capture, using the camera, the second image including a second two-dimensional image and a second depth image, the second depth image being acquired in a specular reflection light condition in which the camera captures specular reflection light that is formed by reflecting, along the second direction of image capture, the illumination light from the illumination light source at the plurality of objects, wherein, when it is determined that the first position and attitude is correct, then converting the first position and attitude according to a change from the first direction of image capture to the second direction of image capture and thus calculating a second position and attitude, and assigning the second position and attitude to the second image and thus generating training data; and (f) changing an actual position and attitude of the plurality of objects and repeating the (b) to (e).

2. The method according to claim 1, wherein the (e) includes:

(e1) finding a direction of specular reflection from the first object in the specular reflection light condition, based on a direction of the illumination light onto the first object and the first position and attitude; and (e2) setting the direction of specular reflection as the second direction of image capture.

3. The method according to claim 1, wherein the second direction of image capture is set in such a direction that the position and attitude recognized by the machine learning model already learned through the prior learning using the second image captured from the second direction of image capture is not determined as correct.

4. The method according to claim 3, further comprising: executing, a plurality of times, processing of recognizing the position and attitude of the first object and performing the correctness determination using the machine learning model already learned through the prior learning, and then registering a history of the position and attitude determined as correct, before the (b) to (f), wherein the second direction of image capture is set in such a direction that a position and attitude with no history of being determined as correct is achieved.

5. The method according to claim 1, wherein the (d) includes:

(d1) generating a simulation image of the first object in the first position and attitude by a simulation;

(d2) calculating a reliability score of the first position and attitude, using the first image and the simulation image; and (d3) comparing the reliability score with a threshold and thus determining whether the first position and attitude is correct or incorrect.

6. A system for generating training data used to learn a machine learning model for recognizing a position and attitude of a first object of a plurality of objects handled by a robot, the plurality of objects being loaded in bulk on a base, the system comprising:

a camera capturing an image of the plurality of objects;

a memory configured to store a program; and a processor configured to execute the program so as to perform generating the training data, wherein the processor is further configured to perform:

(a) processing of executing prior learning of the machine learning model, using simulation data of the plurality of objects loaded in bulk on the base;

(b) processing of capturing a first image of the plurality of objects from a first direction of image capture, using the camera, the first image including a first two-dimensional image and a first depth image, the first depth image being acquired in a diffused reflection light condition in which the camera captures diffuse reflection light that is formed by reflecting, along the first direction of image capture, illumination light from a illumination light source at the plurality of objects;

(c) processing of identifying the first object based on the first image and recognizing a first position and attitude of the first object from the first image, using the machine learning model already learned through the prior learning, the first object being overlapped by another object of the plurality of objects by an overlapping amount, the overlapping amount being 20% or less of an area of the first object being overlapped by the another object;

(d) processing of performing a correctness determination about the first position and attitude;

(e) processing of capturing a second image of the first object from a second direction of image capture that is different from the first direction of image capture, using the camera, the second image including a second two-dimensional image and a second depth image, the second depth image being acquired in a specular reflection light condition in which the camera captures specular reflection light that is formed by reflecting, along the second direction of image capture, the illumination light from the illumination light source at the plurality of objects, wherein, when it is determined that the first position and attitude is correct, then converting the first position and attitude according to a change from the first direction of image capture to the second direction of image capture and thus calculating a second position and attitude, and assigning the second position and attitude to the second image and thus generating training data; and (f) processing of changing an actual position and attitude of the plurality of objects and repeating the processing (b) to (e).

7. A non-transitory computer-readable storage medium storing a computer program causing a processor to execute processing of generating training data used to learn a machine learning model for recognizing a position and attitude a first object of a plurality of objects handled by a robot, the plurality of objects being loaded in bulk on a base, the computer program causing the processor to execute:

(a) processing of executing prior learning of the machine learning model, using simulation data of the plurality of objects loaded in bulk on the base;

(b) processing of capturing a first image of the plurality of objects from a first direction of image capture, using a camera, the first image including a first two-dimensional image and a first depth image, the first depth image being acquired in a diffused reflection light condition in which the camera captures diffuse reflection light that is formed by reflecting, along the first direction of image capture, illumination light from a illumination light source at the plurality of objects;

(c) processing of identifying the first object based on the first image and recognizing a first position and attitude of the first object from the first image, using the machine learning model already learned through the prior learning, the first object being overlapped by another object of the plurality of objects by an overlapping amount, the overlapping amount being 20% or less of an area of the first object being overlapped by the another object;

(d) processing of performing a correctness determination about the first position and attitude;

(e) processing of capturing a second image of the first object from a second direction of image capture that is different from the first direction of image capture, using the camera, the second image including a second two-dimensional image and a second depth image, the second depth image being acquired in a specular reflection light condition in which the camera captures specular reflection light that is formed by reflecting, along the second direction of image capture, the illumination light from the illumination light source at the plurality of objects, wherein, when it is determined that the first position and attitude is correct, then converting the first position and attitude according to a change from the first direction of image capture to the second direction of image capture and thus calculating a second position and attitude, and assigning the second position and attitude to the second image and thus generating training data; and (f) processing of changing an actual position and attitude of the plurality of objects and repeating the processing (b) to (e).

* * * * *